United States Patent
Denis et al.

(10) Patent No.: US 11,673,497 B2
(45) Date of Patent: Jun. 13, 2023

(54) VEHICLE SEAT CONNECTING ELEMENT

(71) Applicant: Faurecia Sièges d'Automobile, Nanterre (FR)

(72) Inventors: Bernard Denis, Itteville (FR); Sabrina Serra, Igny (FR); Larry Narison, Nanterre (FR); Gabrielle Hennequart, Antony (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/364,073

(22) Filed: Jun. 30, 2021

(65) Prior Publication Data
US 2021/0402901 A1 Dec. 30, 2021

(30) Foreign Application Priority Data
Jun. 30, 2020 (FR) .................................... 20 06862

(51) Int. Cl.
*B60N 2/427* (2006.01)
*B60N 2/68* (2006.01)

(52) U.S. Cl.
CPC .......... *B60N 2/682* (2013.01); *B60N 2/42709* (2013.01)

(58) Field of Classification Search
CPC ................................................ B60N 2/42709
See application file for complete search history.

(56) References Cited

U.S. PATENT DOCUMENTS

| 8,967,663 | B2 * | 3/2015 | Seki ...................... B60N 2/4228 280/730.2 |
| 2008/0258519 | A1 | 10/2008 | Niitsuma et al. |
| 2010/0096892 | A1 * | 4/2010 | Meghira ............... B60N 2/4214 297/216.14 |
| 2014/0070578 | A1 * | 3/2014 | Szelagowski ...... B60N 2/42745 297/216.13 |
| 2015/0042133 | A1 * | 2/2015 | Munemura ........ B60N 2/42745 297/452.18 |
| 2015/0091346 | A1 * | 4/2015 | Kitou ..................... B60N 2/682 297/216.14 |

FOREIGN PATENT DOCUMENTS

| CN | 113352963 A * | 9/2021 | .......... B60N 2/2356 |
| DE | 102008006549 A1 | 7/2008 | |
| DE | 102009057880 A1 * | 6/2011 | ............... B60N 2/23 |
| DE | 102014004440 A1 * | 9/2014 | .......... B60N 2/4228 |
| JP | 2006213201 A1 | 8/2006 | |
| JP | 2017206123 A * | 11/2017 | |
| WO | WO-20 12091431 A2 * | 7/2012 | ......... B60N 2/42709 |
| WO | WO-2013133245 A1 * | 9/2013 | .......... B60N 2/0705 |
| WO | WO-2014033963 A1 * | 3/2014 | .......... B60N 2/4228 |
| WO | WO-2016115986 A1 * | 7/2016 | ............... B60N 2/22 |
| WO | WO-2017218240 A1 * | 12/2017 | ............... B60N 2/22 |

OTHER PUBLICATIONS

French Search Report corresponding to French Application No. FR 2006862, dated Mar. 2, 2021, 2 pages.

* cited by examiner

Primary Examiner — Timothy J Brindley
(74) Attorney, Agent, or Firm — Reising Ethington P.C.

(57) ABSTRACT

A connecting element for a vehicle seat includes a body on which a backrest and a seat cushion of the seat are intended to be mounted. The body has a first edge and at least a first through slot extending longitudinally along a first direction from the first edge and defining a first inner end. The connecting element further includes a first bridge extending along at least a portion of the first edge opposite the first slot, with the first bridge having a curved shape.

20 Claims, 4 Drawing Sheets

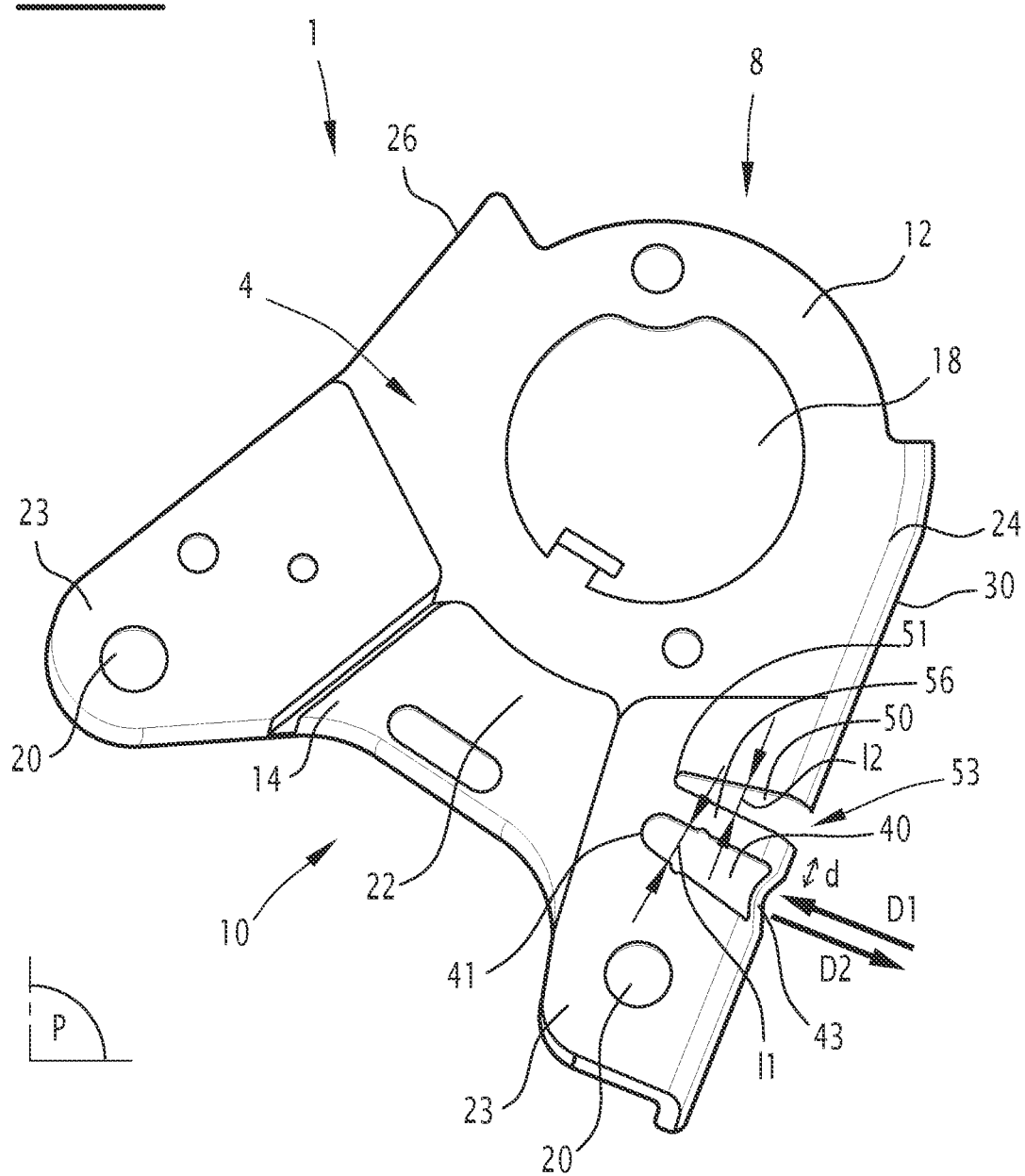

VEHICLE SEAT CONNECTING ELEMENT

TECHNICAL FIELD

The present invention relates to a vehicle seat connecting element of the type comprising a body on which a backrest and a seat cushion of the seat are intended to be mounted, the body defining a first edge and at least a first through slot extending longitudinally in a first direction from the first edge and defining a first inner end.

BACKGROUND

A vehicle seat connecting element, also known as a gusset for connecting a seat cushion to a backrest of a seat, may comprise a vehicle impact energy dissipation device arranged to absorb a portion of the energy due to impact, to protect the seat occupant.

Such a dissipation device is constituted by a through slot, for example.

In the event of an impact, in particular a frontal impact, of the vehicle, the force exerted on the seat may be such that it causes a deformation of the connecting element. The dissipation device then allows a specific controlled deformation of the connecting element, which makes it possible to absorb at least part of the impact energy. To dissipate the energy, the slot deforms, for example, by closing.

Nevertheless, such a dissipation device is difficult to adapt to various situations. For example, adaptation to different types of impacts, different types of seats, different occupant profiles may be required.

SUMMARY

One of the purposes of the invention is to propose a connecting element offering greater adaptability to the shocks it may be subjected to, to the seat on which it is installed and to the profile of the passenger occupying said seat.

To this end, the invention relates to a connecting element of the aforementioned type further comprising a first bridge extending along at least a portion of the first edge opposite the first slot, the first bridge having a curved shape.

Thus, the first bridge provides improved dissipation performance and greater adaptability. The dimensions and geometry of the first bridge, in particular its curvature radius, can be modified to accommodate different types of impacts, different types of seats, and different profiles of the passenger occupying the seat.

According to various embodiments, the connecting element may include any of the following features, taken alone or in any technically conceivable combination:
- the body defines at least a second through slot extending from the first edge of the body and defining a second inner end, the first through slot and the second through slot being separated by a strip of material;
- the second through slot extends substantially parallel to the first direction;
- the connecting element further comprises a second bridge extending along at least a portion of the first edge opposite the second slot;
- the second bridge has a rectilinear shape;
- the second through slot is open along the first edge;
- the strip of material has a strip width, taken along the first edge, of between 1 mm and 10 mm, preferably between 3 mm and 5 mm;
- the first inner end of the first slot and the second inner end of the second slot each have a rounded shape;
- at least one of the first slot and the second slot has a flared shape from the first inner end and/or the second inner end, respectively, toward the first edge;
- each of the first and second slots has:
  - a length, measured along the first direction, of between 5 mm and 30 mm, preferably between 10 mm and 20 mm, and
  - a slot width, measured in a direction perpendicular to the first direction, of between 1 mm and 20 mm;
- the average slot width of the second slot is smaller than the average slot width of the first slot;
- the slot width of the second slot, taken along the first edge, is less than the slot width of the first slot, taken along the first edge;
- the concavity of the first bridge is directed in a second direction opposite to the first direction of extension of the first slot;
- the connecting element further comprises a flange, extending along the first edge substantially perpendicular to said first edge, the first bridge being formed by a portion of the flange.

The invention also relates to a vehicle seat comprising a backrest, a seat cushion and a connecting element as previously described, the backrest and the seat cushion being intended to be mounted on the body of the connecting element.

BRIEF DESCRIPTION OF THE DRAWINGS

Further aspects and advantages of the invention will become apparent from the following description, given by way of example and made with reference to the attached drawings, in which:

FIG. 4 is a schematic side view of a connecting element of a seat, according to a second embodiment of the invention.

DETAILED DESCRIPTION

A connecting element 1 of a vehicle seat is described with reference to FIG. 1. Such a connecting element 1 is also known as a gusset.

Figure 3:
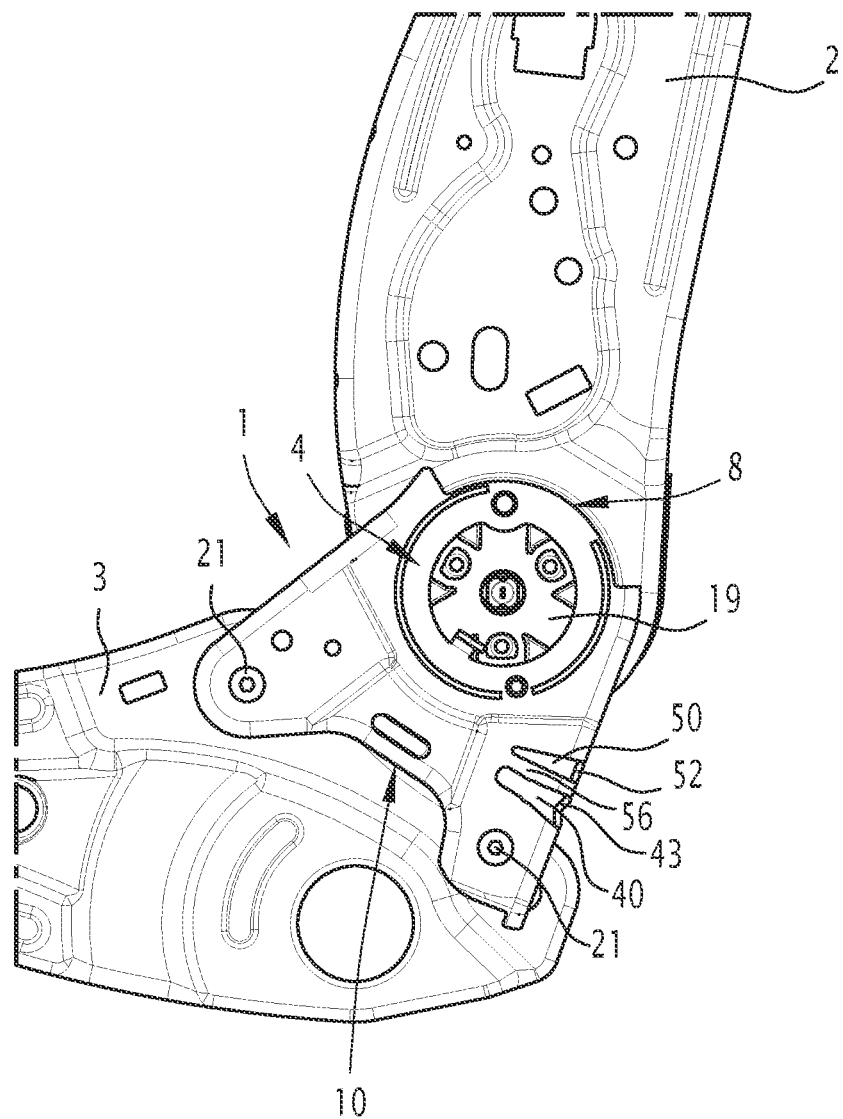
FIG. 3 is a schematic side view of the connecting element of FIG. 1 integrated in a vehicle seat.

The connecting element 1 is configured to connect a backrest 2 and a seat cushion 3 of the seat as shown in FIG. 3, while allowing relative rotational movement between the backrest 2 and the seat cushion 3.

The connecting element 1 comprises a body 4 extending between a first portion 8 and a second portion 10. The first portion 8 is located at one end of the body 4, for example. The second portion 10 is located at an opposite end of the body 4, for example.

With reference to FIGS. 1 through 4, the first portion 8 and the second portion 10 comprise, for example, a first attachment support 12 and a second attachment support 14, respectively.

The first attachment support 12 and the second attachment support 14 are, for example, supports on which the backrest 2 and the seat cushion 3 of the seat are intended to be fixed and/or mounted so as to be able to rotate.

When the backrest and/or the seat cushion are intended to be mounted so as to be able to rotate on the connecting element 1, the first attachment support 12 and/or the second attachment support 14 respectively define, for example, at least one pivot cavity 18 intended to receive at least one pivot connection 19 between the backrest 2 and the connecting element 1 and/or between the seat cushion 3 and the connecting element 1.

The pivot connection 18 is a joint of the backrest or of the seat cushion, for example.

When the backrest 2 and/or the seat cushion 3 are intended to be attached to the connecting element 1, the first attachment support 12 and the second attachment support 14 respectively define, for example, at least one attachment cavity 20 intended to receive at least one attachment element 21 between the backrest 2 and the connecting element 1 and/or between the seat cushion 3 and the connecting element 1.

The fastening element 21 is, for example, a screw or a rivet.

With reference to FIGS. 1 to 4, the first attachment support 12 of the first portion 8 defines a pivot cavity 18 and the second attachment support 14 of the second portion 10 defines a plurality of attachment cavities 20.

The second attachment support 14 comprises a base 22 for connection to the first attachment support 12 and two arms 23 extending from the base 22 in a direction away from the first attachment support 12.

The body 4 extends substantially along a plane P. The body 4 defines a first edge 24 and a second edge 26 extending between the first portion 8 and the second portion 10 on either side of the body 4. The second edge 26 is opposite the first edge 24, for example.

The first and second edges 24 and 26 define the edges of the first and the second connection support 12, 14 and extend from a first end of the first portion 8 towards a second end of the second portion 10 of the arms 23 in particular.

The connecting element 1 further comprises a flange 30 extending substantially perpendicularly with respect to the plane P along at least one of the first edge and the second edge 24, 26, towards a free end of the flange 30.

With reference to FIGS. 1 through 4, a flange 30 extends along each of the first and second edges 24 and 26.

The body 4 defines at least a first through slot 40.

The first through slot 40 extends longitudinally along a first direction D1 from the first edge 24. The first through slot 40 extends toward the second edge 26 of the body 4, for example. The first through slot 40 defines a first inner end 41 to which it extends from the first edge 24.

With reference to FIGS. 1 through 4, the first through slot 40 extends between the pivot cavity 18 of the first portion 8 and an attachment cavity 20 of the second portion 10.

The first inner end 41 of the first through slot 40 has a rounded shape, for example.

The connecting element 1 further comprises a first bridge 43 extending along at least a portion of the first edge 24 opposite the first slot 40. The first bridge 43 closes the first through slot 40. The first bridge 43 constitutes an end of the first through slot 40 opposite the first inner end 41. In other words, the first through slot 40 is delimited by the body 4 and by the first bridge 43.

With reference to FIGS. 1 through 4, the first bridge 43 is formed by a portion of the flange 30.

As illustrated in FIGS. 1 to 4, the first bridge 43 is integral with the flange 30, for example.

The first bridge 43 has a curved shape, for example. This curved shape has a concavity.

The concavity of the first bridge 43 is directed along a second direction D2 opposite to the first direction D1, for example, i.e., it is turned towards the outside of the body 4.

The body 4 defines a second through slot 50, for example.

The second through slot 50 extends from the first edge 24 of the body 4. The second through slot 50 defines a second inner end 51 to which it extends from the first edge 24. The second through slot 50 extends substantially parallel to the first direction D1, for example. The second through slot 50 extends to the second edge 26 of the body 4, for example.

The body 4 comprises a strip of material 56 extending between the first through slot 40 and the second through slot 50.

The strip of material 56 has a strip width d of between 1 mm and 10 mm, measured along the first edge 24, preferably between 3 mm and 5 mm.

The strip width d thus also represents the distance between the first through slot 40 and the second through slot 50 along the first edge 24.

The strip width d is variable along the strip of material 56, along the direction D1, for example.

The second inner end 51 of the second through slot 50 has a rounded shape, for example.

Figure 1:
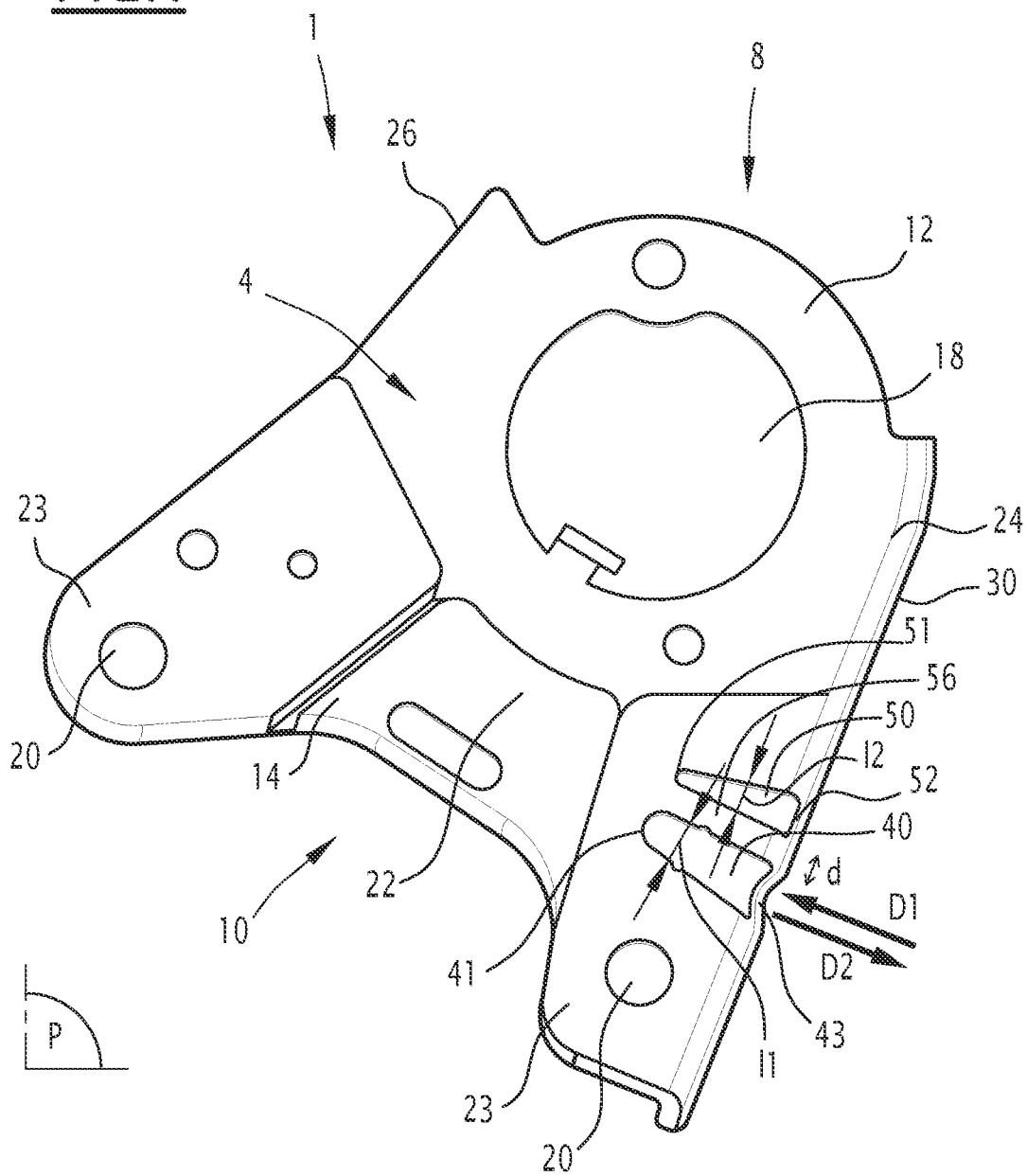
FIG. 1 is a schematic side representation of a connecting element of a seat, according to a first embodiment of the invention.
Figure 2:
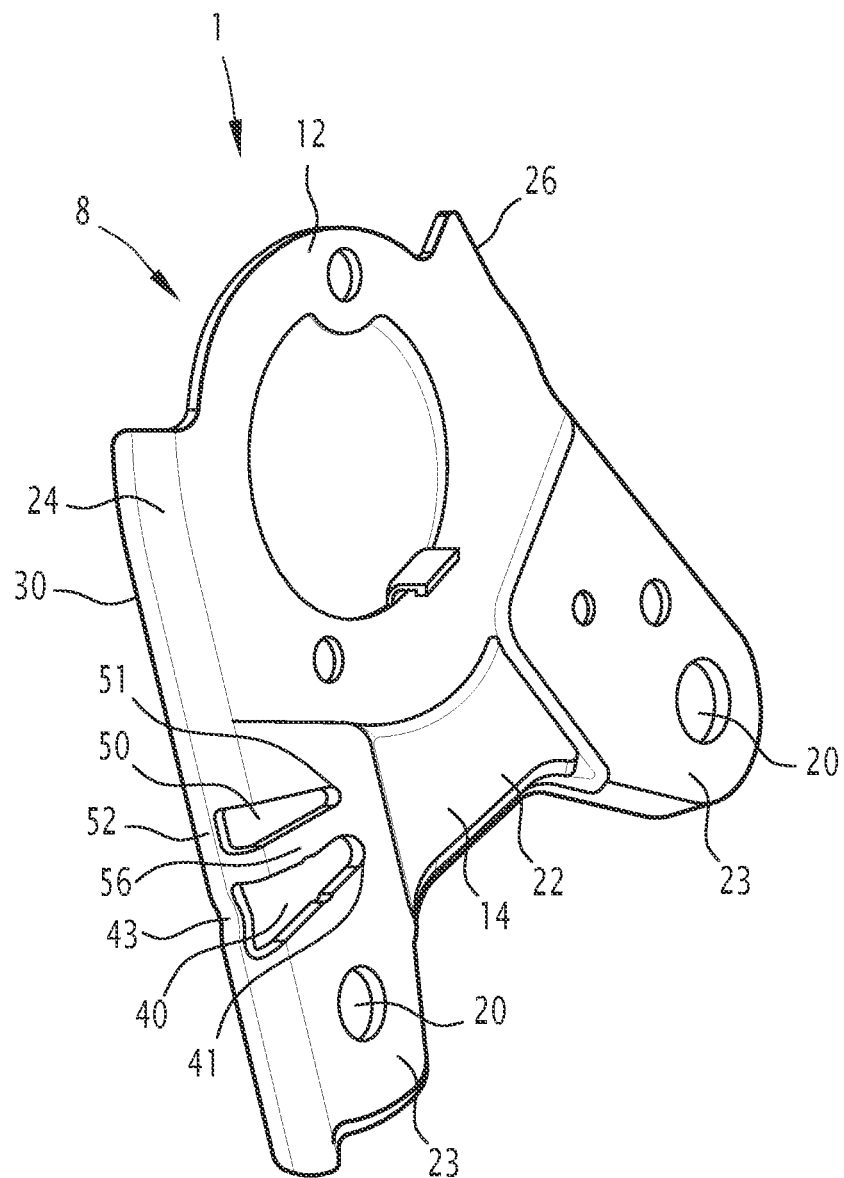
FIG. 2 is a schematic perspective representation of the connecting element of FIG. 1.

According to a first embodiment illustrated in FIGS. 1 to 3, the connecting element 1 further comprises a second bridge 52 extending along at least a portion of the first edge 24 opposite the second slot 50. The second bridge 52 closes the second through slot 50. The second bridge 52 constitutes an end of the second through slot 50 opposite the second inner end 51. In other words, the second through slot 50 is delimited by the body 4 and by the second bridge 52.

With reference to FIGS. 1 through 3, the second bridge 52 is formed by a portion of the flange 30.

As shown in FIG. 2, the second bridge 52 is integral with the flange 30, for example.

The second bridge 52 has a rectilinear shape, for example, i.e., it is not curved like the first bridge 43.

Each of the first and second through slots 40, 50 has a length measured along the first direction D1. Each slot length is between 5 mm and 30 mm, for example, preferably between 10 mm and 20 mm.

Each of the first and second through slots 40, 50 has a slot width I1, I2, measured along a direction perpendicular to the first direction D1. Each slot width I1, I2 is, between 1 mm and 20 mm, for example. The slot width I1, I2, along the first edge 24 is between 10 mm and 20 mm, for example.

As illustrated in FIGS. 1 to 4, the average slot width I2 of the second through slot 50 is, smaller than the average slot width I1 of the first through slot 40, for example.

As illustrated in FIGS. 1 through 4, the slot width I2 of the second through slot 50, taken along the first edge 24 is less than the slot width I1 of the first through slot 40, for example.

At least one of the first through slot 40 and the second through slot 50 has a flared shape from the first inner end 41 and/or the second inner end 51 toward the first edge 24, respectively. In other words, the slot width I1, I2 of at least one, between the first through slot 40 and the second through slot 50, increases from the inner end 41, 51 toward the first edge 24.

With reference to FIGS. 1 to 4, the first through slot 40 and the second through slot 50 have such a flared shape, for example.

As illustrated in FIGS. 1 to 4, the distance between the first through slot 40 and the second portion 10 measured along the first edge 24 is smaller than the distance between the second through slot 50 and the second portion 10 measured along the first edge 24.

According to one variant, the distance between the first through slot 40 and the second portion 10 measured along the first edge 24 is greater than the distance between the second through slot 50 and the second portion 10 measured along the first edge 24.

In the following, the operation of the connecting element 1 in use in a seat is described.

A backrest 2 of the seat is fixed or rotatably mounted on the first attachment support 12 or the second attachment support 14. With reference to FIG. 3, the backrest of the seat is rotatably mounted on the first attachment support 12, for example.

A seat cushion 3 of the seat is fixed or rotatably mounted on the first attachment support 12 or the second attachment support 14. With reference to FIG. 3, the seat cushion 3 is attached to the second attachment support 14, for example.

With reference to FIGS. 1 to 4, the first edge 24 corresponds to a rear edge of the connecting element 1, extending towards the rear of the seat and the second edge 26 corresponds to a front edge of the connecting element 1, extending towards the front of the seat. In the case of a seat facing the front of the vehicle, the rear edge is the edge away from the bearing surface on which an occupant of the seat rests, as compared to the front edge, which is the edge close to the bearing surface. In the case of a seat facing the rear of the vehicle, the rear edge is the edge close to the support surface and the front edge is the edge away from the support surface.

In the event of an impact to the vehicle, when an impact force greater than a predetermined force is applied to the seat, the connecting element 1 is deformed so as to dissipate the impact energy. In this way, the connecting element 1 dissipates at least part of the energy due to the impact by deformation.

For example, in the event of an impact to the vehicle, when an impact force greater than a predetermined force is applied to the seat, compression or tension may be induced on the connecting element 1, along the first and second edges 24, 26.

Because the first through slot 40 and the second through slot 50 are recesses extending into the body 4 of the connecting element 1, they represent favored deformation areas when a force is applied to the connecting element 1.

In particular, the lengths of the first and second through slots 40, 50 as well as their flared shape favor the decrease or enlargement of their slot widths I1, I2 when an impact force is applied to the connecting element 1.

In particular, with reference to FIGS. 1 to 4, when an impact occurs on the vehicle, particularly a rear impact, and when an impact force is applied to the seat, the connecting element 1 is deformed so that the slot width I1, I2 of at least one of the first through slot 40 and the second through slot 50 is decreased.

When a front impact occurs on the vehicle, the connecting element 1 is deformed such that the slot width I1, I2 of at least one of the first through slot 40 and the second through slot 50 is increased. The lengths of the first and/or second through slots 40, 50 may also be increased in this case.

According to the first embodiment illustrated in FIGS. 1 to 3, in contrast to the first bridge 43, which has a curvilinear shape, the second bridge 52 has a rectilinear shape. Thus, the second bridge 52 is more resistant to compression or tension resulting from the impact force and directed along the first edge 24. Thus, the second through slot 50 is more resistant to compression or tension resulting from the impact force.

Thus, advantageously, when an impact force is applied to the seat, the connecting element 1 is deformed such that the slot width I1 of the first through slot 40 is decreased in a first step, and then the slot width I2 of the second through slot 50 is decreased in a second step.

The first bridge 43 and the second bridge 52 are thus elements enabling increased resistance to deformation of the first and second through slots 40, 50. In addition, when the connecting element 1 is deformed, the first and second bridges 43, 52 bend by absorbing at least a portion of the impact energy.

The curved shape of the first bridge 43 enables modulation of the resistance to deformation of the first through slot 40. Thus, the greater the curvature of the first bridge 43, the less the resistance to deformation of the first through slot 40.

Modulating the slot lengths and widths of the first and second through slots 40, 50, the width of the strip of material 56, the geometry of the first bridge 43, in particular the curvature of the first bridge 43, as well as the geometry of the second bridge 52, enables modification of the deformation response of the connecting element 1 enabling adaptation to different impact forces, different types of seats and different occupant profiles, for example.

The connecting element 1 thus allows for a greater variety of deformation responses of the connecting element 1, so that the connecting element 1 exhibits greater adaptability and improved energy dissipation performance as a function of different variables such as the type of impact force applied thereto, the type of seat in which it is implemented, and the profile of the seat occupant.

According to one variant of the first embodiment, the first bridge 43 is formed by a portion of the body 4.

According to another variant, the first bridge 43 is an attached element and fixed to the flange 30.

According to yet another variant, the second bridge 52 is formed by a portion of the body 4.

According to another variant, the second bridge 52 is an added on element and fixed to the flange 30.

In another variant, the second bridge 52 is also curved.

According to another variant, the average slot width I2 of the second through slot 50 is equal to the average slot width I1 of the first through slot 40.

According to a second embodiment illustrated in FIG. 4, the connecting element 1 does not comprise a second bridge 52. The flange 30 comprises an opening 53 extending opposite the second through slot 50. In other words, the flange 30 comprises a removal of material opposite the second through slot 50. The flange 30 is thus discontinuous along the first edge 24. The flange 30 thus comprises two flange portions separated by the opening 53. The second through slot 50 is thus open along the first edge 24.

The second through slot 50 is then less resistant to compression or tension resulting from the impact force and directed along the first edge 24 than the first through slot 40. Thus, advantageously, when an impact force is applied to the seat, the connecting element 1 is deformed so that the slot width I2 of the second through slot 50 is decreased in a first step, and then the slot width I1 of the first through slot 40 is decreased in a second step.

Whether or not a second bridge 52 is installed represents an additional parameter enabling modification of the deformation response of the connecting element 1.

According to an embodiment not illustrated, the connecting element 1 does not comprise a first bridge 43 or a second bridge 52. Therefore, the flange 30 comprises three flange portions separated by the two openings. The first and second through slots 40, 50 are thus open along the first edge 24.

According to this embodiment, the connecting element 1 comprises a body 4 on which a backrest 2 and a seat cushion 3 of the seat are intended to be mounted. The body 4 defines a first edge 24 and at least a first through slot 40 extending longitudinally along the first direction D1 from the first edge 24 and defining a first inner end 41. The connecting element 1 further comprises at least a second through slot 50 extending longitudinally from the first edge 24 and defining a second inner end 51. The first through slot 40 and the second through slot 50 are separated by the strip of material 56.

The invention claimed is:

1. A vehicle seat connecting element comprising a body on which a backrest and a seat cushion of the seat are intended to be mounted,
the body defining a first edge and at least a first through slot extending longitudinally along a first direction from the first edge and defining a first inner end,
wherein the connecting element further comprises a first bridge extending along at least a portion of the first edge opposite the first slot, the first bridge having a curved shape,
wherein the first bridge closes the first through slot,
wherein the first bridge constitutes an end of the first through slot opposite the first inner end,
wherein the body defines at least a second through slot extending from the first edge of the body and defining a second inner end, the first through slot and the second through slot being separated by a strip of material, and
wherein at least one of the first slot and the second slot has a flared shape from the first inner end and/or the second inner end, respectively, toward the first edge.

2. The connecting element according to claim 1, wherein the second through slot extends substantially parallel to the first direction.

3. The connecting element according to claim 1, further comprising a second bridge extending along at least a portion of the first edge opposite the second slot.

4. The connecting element according to claim 3, wherein the second bridge has a rectilinear shape.

5. The connecting element according to claim 1, wherein the second through slot is open along the first edge.

6. The connecting element according to claim 1, wherein the strip of material has a strip width, taken along the first edge, of between 1 mm and 10 mm.

7. The connecting element according to claim 1, wherein the first inner end of the first slot and the second inner end of the second slot each have a rounded shape.

8. The connecting element according to claim 1, wherein each of the first and second slots has:
a length, measured along the first direction, of between 5 mm and 30 mm, and
a slot width, measured in a direction perpendicular to the first direction, of between 1 mm and 20 mm.

9. The connecting element according to claim 1, wherein an average slot width of the second slot is smaller than an average slot width of the first slot.

10. The connecting element according to claim 1, wherein a slot width of the second slot, taken along the first edge, is less than a slot width of the first slot, taken along the first edge.

11. The connecting element according to claim 1, wherein a concavity of the first bridge is directed in a second direction opposite to the first direction of extension of the first slot.

12. The connecting element according to claim 1, further comprising a flange extending along the first edge substantially perpendicular to said first edge, the first bridge being formed by a portion of the flange.

13. A vehicle seat comprising a backrest, a seat cushion, and a connecting element according to claim 1, the backrest and the seat cushion being intended to be mounted on the body of the connecting element.

14. The connecting element according to claim 6, wherein the strip width is between 3 mm and 5 mm.

15. The connecting element according to claim 8, wherein the length is between 10 mm and 20 mm.

16. A vehicle seat connecting element comprising a body on which a backrest and a seat cushion of the seat are intended to be mounted,
the body defining a first edge and at least a first through slot extending longitudinally along a first direction from the first edge and defining a first inner end,
wherein the connecting element further comprises a first bridge extending along at least a portion of the first edge opposite the first slot, the first bridge having a curved shape,
wherein the first bridge closes the first through slot,
wherein the first bridge constitutes an end of the first through slot opposite the first inner end,
wherein the body defines at least a second through slot extending from the first edge of the body and defining a second inner end, the first through slot and the second through slot being separated by a strip of material, and
wherein the strip of material has a strip width, taken along the first edge, of between 1 mm and 10 mm.

17. The connecting element of claim 16, further comprising a second bridge extending along at least a portion of the first edge opposite the second slot.

18. The connecting element of claim 17, wherein the second bridge has a rectilinear shape.

19. A vehicle seat connecting element comprising a body on which a backrest and a seat cushion of the seat are intended to be mounted,
the body defining a first edge and at least a first through slot extending longitudinally along a first direction from the first edge and defining a first inner end,
wherein the connecting element further comprises a first bridge extending along at least a portion of the first edge opposite the first slot, the first bridge having a curved shape,
wherein the first bridge closes the first through slot,
wherein the first bridge constitutes an end of the first through slot opposite the first inner end, and
wherein the body defines at least a second through slot extending from the first edge of the body and defining a second inner end, the first through slot and the second through slot being separated by a strip of material,
the connecting element further comprising a second bridge extending along at least a portion of the first edge opposite the second slot, wherein the second bridge has a rectilinear shape.

20. The connecting element according to claim 19, wherein the second through slot extends substantially parallel to the first direction.

* * * * *